(12) United States Patent
Abreu (10) Patent No.: US 9,517,701 B2
(45) Date of Patent: Dec. 13, 2016

(54) DISTRIBUTED BATTERY MANAGEMENT SYSTEM FOR REMOTE REPLETION OF ELECTRIC VEHICLES

(71) Applicant: TALINO EV MANAGEMENT SYSTEMS INC., Stamford, CT (US)

(72) Inventor: Enrique Abreu, Stamford, CT (US)

(73) Assignee: TALINO EV MANAGEMENT SYSTEMS INC., Stamford, CT (US)

( * ) Notice: Subject to any disclaimer, the term of this patent is extended or adjusted under 35 U.S.C. 154(b) by 223 days.

(21) Appl. No.: 13/784,138

(22) Filed: Mar. 4, 2013

(65) Prior Publication Data

US 2014/0249706 A1    Sep. 4, 2014

(51) Int. Cl.
*B60L 11/18* (2006.01)

(52) U.S. Cl.
CPC .......... *B60L 11/184* (2013.01); *B60L 11/1862* (2013.01); *B60L 2240/622* (2013.01); *B60L 2240/70* (2013.01); *B60L 2250/10* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
CPC ........ B60L 11/1827; B60L 11/18; B60L 15/02
USPC .......... 701/22, 123, 32.4; 320/103, 128, 115
See application file for complete search history.

(56) References Cited

U.S. PATENT DOCUMENTS

| | | | | |
|---|---|---|---|---|
| 7,053,588 B2* | 5/2006 | Nakanishi | ........... | B60L 11/1851 320/104 |
| 7,397,359 B2* | 7/2008 | Sparacino | ............ | G01R 31/007 324/522 |
| 8,314,587 B2* | 11/2012 | White | ................. | B60L 11/1816 320/103 |
| 8,896,315 B1* | 11/2014 | Davies | .................. | H02J 7/0019 320/117 |
| 2008/0275600 A1* | 11/2008 | Rask | ........................ | B60K 6/24 701/22 |
| 2009/0139781 A1* | 6/2009 | Straubel | .............. | B60L 11/1875 180/65.1 |
| 2009/0246596 A1* | 10/2009 | Sridhar | ............... | B60L 11/1816 429/513 |
| 2010/0094496 A1* | 4/2010 | Hershkovitz | .............. | B60L 3/12 701/22 |
| 2010/0141203 A1* | 6/2010 | Graziano | ............ | B60L 11/1816 320/109 |

(Continued)

FOREIGN PATENT DOCUMENTS

| | | |
|---|---|---|
| JP | 2004-166367 A | 6/2004 |
| WO | 2006/018695 | 2/2006 |
| WO | 2010/137462 | 12/2010 |

*Primary Examiner* — Thomas G Black
*Assistant Examiner* — Wae Louie
(74) *Attorney, Agent, or Firm* — Occhiuti & Rohlicek LLP (57) ABSTRACT

An apparatus for providing transportation includes an electric vehicle having a battery, an electric motor, a transceiver, and a battery manager. The battery manager includes a controller configured to control flow of charge between said battery and the electric motor at least in part in response to information received by the transceiver.

22 Claims, 5 Drawing Sheets

(56) References Cited

U.S. PATENT DOCUMENTS

| | | | | |
|---|---|---|---|---|
| 2011/0047052 A1* | 2/2011 | Cornish | ............... | B60L 11/1861 705/30 |
| 2011/0144844 A1* | 6/2011 | Ishibashi | ............ | B60L 11/1846 701/22 |
| 2012/0161699 A1* | 6/2012 | Chiang | ................. | H02J 7/0004 320/109 |
| 2012/0290149 A1* | 11/2012 | Kristinsson | ........... | B60W 10/06 701/2 |
| 2013/0054069 A1* | 2/2013 | Komiya | .................. | B60L 1/003 701/22 |
| 2013/0166119 A1* | 6/2013 | Kummer | ............. | H01M 10/443 701/22 |
| 2013/0179061 A1* | 7/2013 | Gadh | ................. | B60L 11/1842 701/123 |
| 2013/0217409 A1* | 8/2013 | Bridges | ............... | B60L 11/1842 455/456.1 |
| 2013/0264865 A1* | 10/2013 | Sugeno | ..................... | H02J 5/00 307/9.1 |
| 2013/0274975 A1* | 10/2013 | Gregg | .................. | B60W 10/196 701/22 |
| 2013/0282472 A1* | 10/2013 | Penilla | ................. | B60L 11/1822 705/14.35 |
| 2013/0320772 A1* | 12/2013 | Qiao | ..................... | H01M 10/04 307/87 |
| 2014/0002027 A1* | 1/2014 | Guan | .................... | H02J 7/0014 320/128 |
| 2014/0015495 A1* | 1/2014 | Woo | ...................... | H02J 7/0052 320/160 |
| 2014/0111161 A1* | 4/2014 | Kim | ...................... | H01M 10/42 320/128 |
| 2014/0249706 A1* | 9/2014 | Abreu | ................. | B60L 11/184 701/22 |
| 2014/0312837 A1* | 10/2014 | Abreu | ................. | B60L 11/1824 320/109 |

* cited by examiner

DISTRIBUTED BATTERY MANAGEMENT SYSTEM FOR REMOTE REPLETION OF ELECTRIC VEHICLES

FIELD OF DISCLOSURE

This disclosure relates to electric vehicles, and in particular, to battery management for electric vehicles.

BACKGROUND

Electric vehicles are generally more costly than comparable gasoline powered vehicles. This cost differential arises in great measure as a result of the batteries in electric vehicles.

Known battery management systems protect the valuable investment in a battery by preventing damage from overcharging or excess depletion. In doing so, they postpone the need to replace the battery. However, these known battery management systems do nothing to manage the overall cost of a battery in the first place.

SUMMARY

The invention is based in part on the recognition that a battery is in effect a consumable item in much the same way that gasoline is a consumable item in a conventional vehicle. Thus, to charge the consumer for the cost of a battery at the time of purchase is analogous to charging the consumer for the cost of gasoline to be used by the vehicle at the time of purchase. With this perspective in mind, it should come as no surprise that electric vehicles tend to be more costly.

The invention thus aims to provide a technical solution to the problem of allocating the bolus of cost associated with a battery purchase over time in a way that makes it economically practicable to sell electric vehicles at costs that make them competitive with conventional vehicles.

In one aspect, the invention features an apparatus for providing transportation. Such an apparatus includes electric vehicle having a battery, an electric motor, a transceiver, and a battery manager. The battery manager includes a controller configured to control flow of charge between the battery and the electric motor at least in part in response to information received by the transceiver.

Information received by the transceiver can be anything indicative of use of the battery, such as a charge ration or a time ration, or a ration of distance travelled.

In some embodiments, the controller is configured to receive, via the transceiver, information representative of a charge ration and to control operation of the battery based on a difference between the charge ration and accumulated charge drawn since receiving the information representative of the charge ration.

In other embodiments, the controller is configured to halt flow of charge between the battery and the electric motor at least in part in response to information received by the transceiver.

In yet other embodiments, the controller is configured to receive, via the transceiver, information representative of a charge ration and to halt flow of charge from the battery when the charge ration and an accumulated charge drawn since receiving the information representative of the ration are equal.

Also included among the various embodiments of the invention are those in which the controller is configured to receive, via the transceiver, information representative of a charge ration and to provide a warning when a difference between the charge ration and an accumulated charge drawn since receiving the information representative of the charge ration reaches a pre-selected value.

In some embodiments, the controller is configured to receive instructions, via the transceiver, to immediately exercise control over flow of charge between the battery and the motor.

Other embodiments of the invention further include a GPS unit in communication with the controller. Among these are those embodiments in which the controller is configured to exercise control over flow of charge between the battery and the motor based at least in part on information provided by the GPS unit, and those in which the GPS unit is configured to provide information representing a location of a repletion station for providing an opportunity to cause additional information to be provided to the controller via the transceiver.

In some embodiments, the apparatus also includes a clearinghouse for communicating with transceivers associated with a plurality of electric vehicles. Among these are embodiments in which the clearinghouse is configured to receive information from a plurality of repletion stations, the information being representative of a charge ration.

In yet other embodiments, the information received by the transceiver, includes information indicative of a maximum elapsed time.

Other embodiments include those in which the information received by the transceiver, includes information indicative of a maximum elapsed time and information indicative of a maximum allotted charge. Among these are those embodiments in which the controller is configured to track time usage and charge usage and to disable charge flow from the battery in response to detecting that the charge usage has reached a first pre-defined value and that the time usage has reached a second pre-defined value. Among this latter group of embodiments are those in which the controller is configured to track time usage and to begin to track charge usage when the time usage has reached a first pre-defined value. This third set of embodiments includes those in which the controller is configured to disable charge flow from the battery in response to detecting that the charge usage has reached a second pre-defined value.

Also included within the scope of the invention are apparatus that include any combination of the foregoing features.

In another aspect, the invention includes method for managing usage of a battery in an electric vehicle. Such a method includes receiving information indicative of a usage ration for the battery; during operation of the electric vehicle, causing the usage ration to traverse a trajectory through a battery usage space; detecting that the usage point has reached a designated point in the usage space; and disabling charge flow from the battery to a motor of the electric vehicle.

Some practices of the foregoing method also include causing the usage ration to traverse a trajectory includes traversing a path parallel to a time-usage axis followed by traversing a path parallel to a charge-usage axis.

In other practices of the method, receiving information indicative of a usage ration for the battery includes receiving, from a remote repletion site, information indicating that a user has paid of a usage ration.

Also included within the scope of the invention are methods that include any of the foregoing features.

In another aspect, the invention features an apparatus for providing transportation. Such an apparatus includes an electric motorcycle, the electric motorcycle having a battery, means for receiving information, and means for controlling flow of charge from the battery in response to information received by the means for receiving information.

In another aspect, the invention also includes a manufacture that includes a tangible and non-transitory computer-readable medium having encoded thereon instructions for causing the microcontroller to implement any of the foregoing features or for causing the microcontroller to execute any of the foregoing methods.

These and other features of the invention will be apparent from the following detailed description, and the accompanying figures, in which:

DETAILED DESCRIPTION

Figure 1:
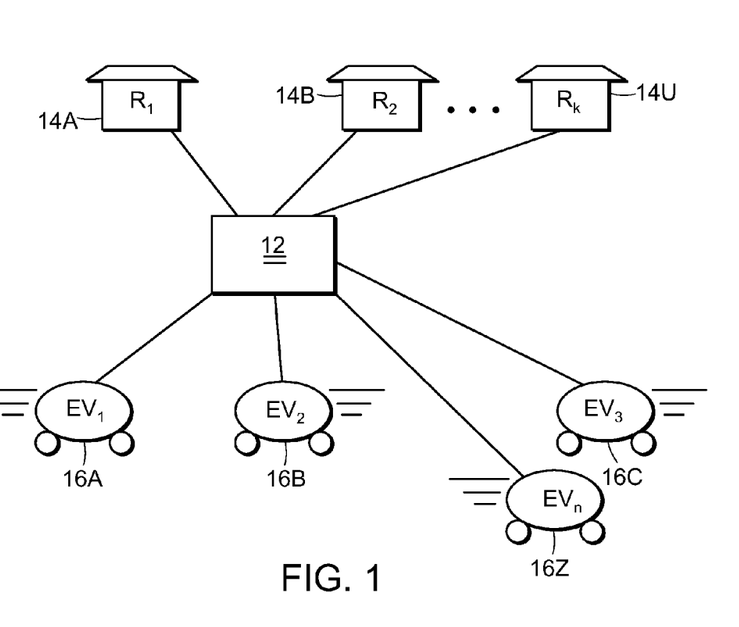
FIG. 1 is an overview of a distributed battery management system.

In one embodiment, shown in FIG. 1, a distributed battery management system 10 includes a central clearinghouse 12 in communication with repletion sites 14A-14U and electric vehicles 16A-16Z. Communication between the clearinghouse 12 and the repletion sites 14A-14U can be a circuit-switched connection, such as that provided via a cellular phone network, such as a GSM network or by a wired telephone link. Alternatively, communication can be established by a packet-switched connection, such as via a computer network, for example the Internet.

Figure 2:
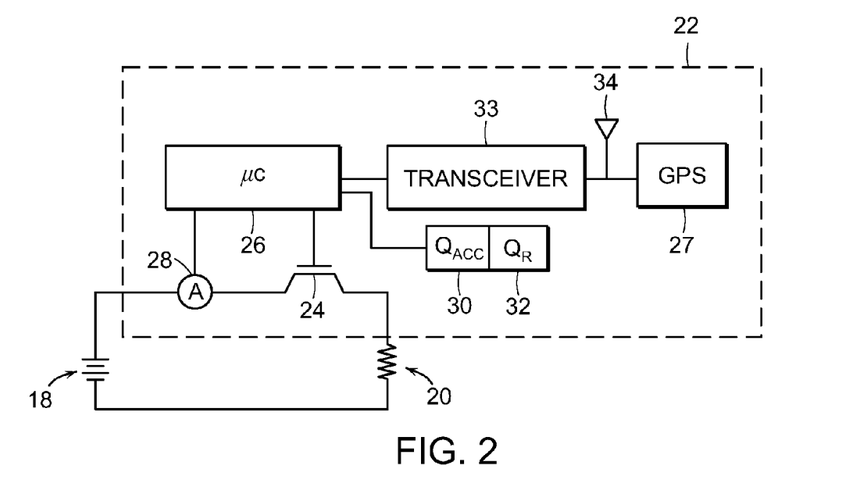
FIG. 2 shows the components within one of the electric vehicles shown in FIG. 1.

Referring now to FIG. 2, each electric vehicle 16A includes a battery 18 connected to an electric motor 20 by way of a gatekeeper 22. Charge flows from the battery 18 to the electric motor 20 by way of a power transistor 24, the gate terminal of which is controlled by a microcontroller 26 within the gatekeeper 22. In normal operation, the microcontroller 26 maintains a voltage at the gate terminal that allows current to flow between the source and drain terminals of the transistor 24.

The microcontroller 26 within the gatekeeper 22 receives data from a counter 28 that tracks a usage parameter indicative of an extent to which the battery 18 is used. In one embodiment, the counter 28 is a coulomb counter, and the usage parameter is how much charge flows from the battery 18. In this embodiment, the microcontroller 26 maintains a running total of drawn charge in an accumulation register 30. The microcontroller 26 periodically compares the drawn charge with a rationed charge stored in a rationed-charge register 32. When the drawn charge exceeds the rationed charge, the microcontroller 26 sends a signal to the gate terminal to prevent further current flow between source and drain. This prevents the electric vehicle 16A from moving under its own power.

In some embodiments, the microcontroller 26 determines when the drawn charge in the accumulation register 30 has almost reached the rationed charge in the rationed-charge register 32, at which point it alerts the driver. This feature is particularly useful for preventing the driver from being surprised by a loss of power at an inconvenient location and prompts the driver to visit a suitable repletion site 14 to carry out a repletion as described below.

In order to operate the electric vehicle 16A again, the driver must re-set the accumulation register 30 to zero. This requires the use of a transceiver 33 connected to the gatekeeper 22 via an antenna 34 for communication with the clearinghouse 12.

The process of re-setting the accumulation register 30, which is referred to as "repletion," begins with the driver going to one of the repletion sites 14A-14U in FIG. 1. The driver then provides information identifying his electric vehicle 16A and tenders payment for authorization to withdraw additional charge from the battery 18. The repletion site 14U then transmits a message to the clearinghouse 12 indicating that the driver has made such a payment. In response, the clearinghouse 12 transmits a message to the gatekeeper 22, which proceeds to re-set the accumulation register 30 and to re-set the maximum drawn charge to whatever the driver has paid for. This completes the repletion process.

Figure 3:
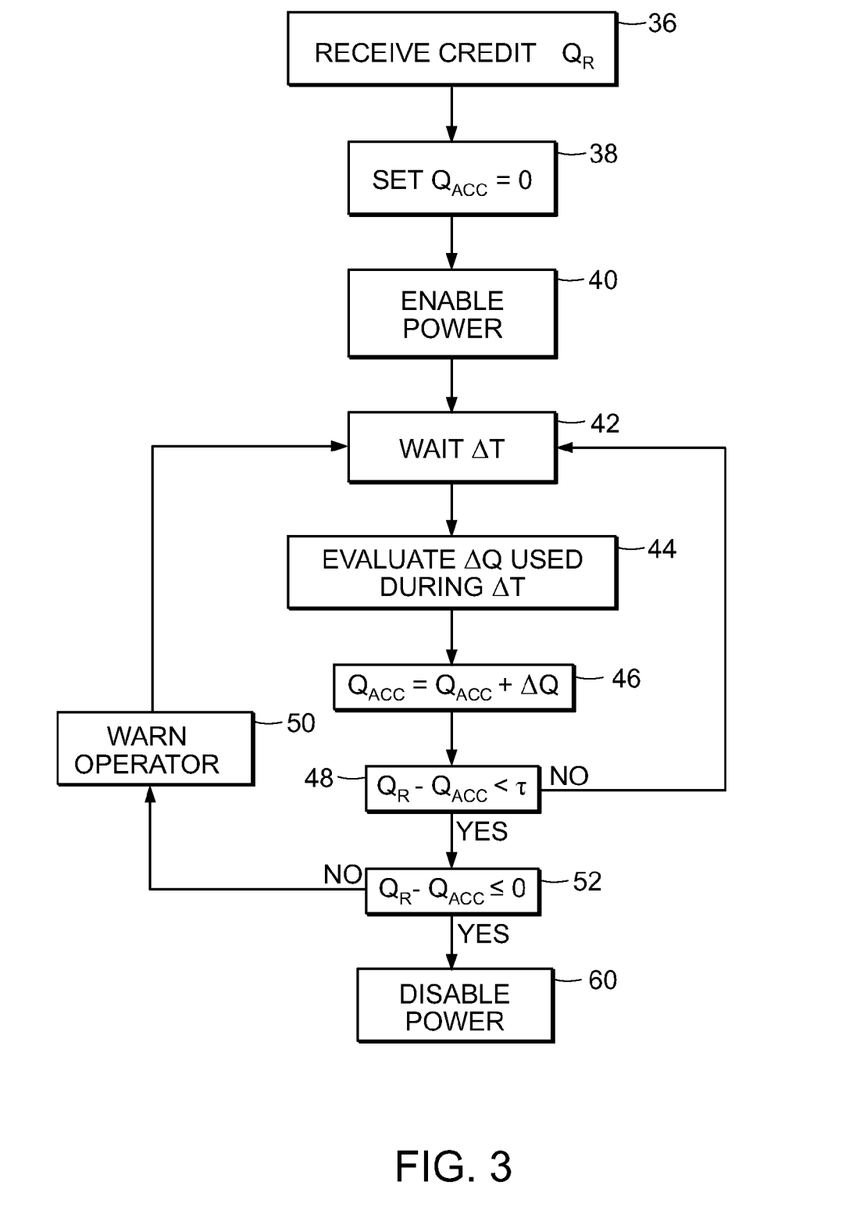
FIG. 3 shows a process carried out by a microcontroller in one of the electric vehicles in FIG. 1.

FIG. 3 shows an example process implemented by the microcontroller 26 following the step of receiving a repletion credit from the clearinghouse 12 for a ration of charge (step 36). The microcontroller 26 sets the accumulation register to zero (step 38) and enables current flow from the battery 18 (step 40). The microcontroller 26 then waits a suitable interval (step 42) and determines the amount of charge drawn in that interval (step 44). Then, the microcontroller 26 adds this amount to the accumulation register 30 (step 46). If the amount shown in the accumulation register 30 comes too close to the rationed charge amount (step 48) in the charge ration register 32, the microcontroller 26 sends a warning to the driver to find a repletion site 14A-14U (step 50). If the amount in the accumulation register reaches the rationed amount (step 52), the microcontroller 26 shuts down the electric vehicle 16A (step 60).

It is important to note that the distributed battery management system 10 described herein effectively decouples the process of charging the battery 18 from the process of using it. The battery 18 may be completely full of charge at the time the microcontroller 26 renders the electric vehicle 16A inoperable.

In effect, when the driver pays for repletion, he is paying for the right to use the battery 18. This provides a back-handed way of paying for the battery 18 itself independently of the charge in the battery. Since the battery 18 is effectively paid for over time through payment for the release of charge, the cost of the battery 18 no longer needs to be such a significant part of the cost of the electric vehicle 16A. This in turn allows the electric vehicle 16A to be sold at a price comparable to a conventional vehicle.

In another embodiment, the usage parameter is elapsed operating time. In this embodiment, the counter 28 is a time counter. The operation of such an embodiment is analogous to that described above in connection with FIG. 3.

Figure 4:
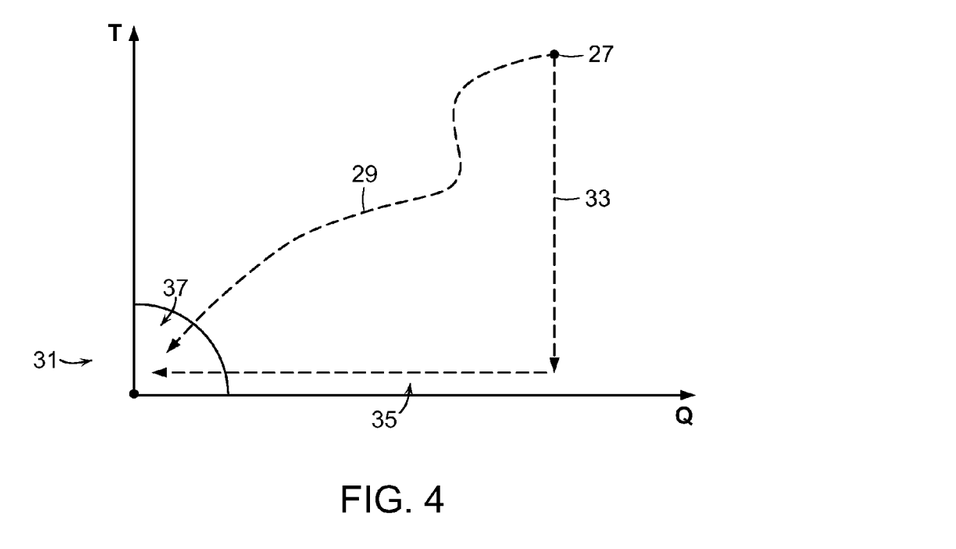
FIG. 4 shows trajectories of a usage parameter in a two-dimensional battery usage space for managing usage of the battery in FIG. 2.

In yet another embodiment, the usage parameter is a vector quantity rather than a scalar quantity. For example, the usage parameter can be a two-dimensional vector in which one element represents charge and the other represents elapsed time, as shown in FIG. 4. The act of repletion, in this case, can be viewed as establishing an initial location 27 of the usage parameter in the usage space. The microcontroller 26, using the output of the counter 28, determines a trajectory 29 of the usage parameter as it makes its way towards a designated end-point 31, at which point further usage of the vehicle 16A is forbidden. Some embodiments include a warning zone 37 surrounding the end-point 31 so that when a trajectory 29, 35 enters the warning zone 37, the microcontroller 26 issues a warning to the user of the electric vehicle 16A.

In some embodiments, the trajectory of the usage parameter is at all times parallel to the axes of the usage space. For example, in one embodiment, the microcontroller 26 first fully depletes time and then begins depleting charge. This is equivalent to a trajectory that with a first segment 33 parallel to the time axis until no time is left, and a second segment 35 that runs parallel to the charge axis until no charge is left. Conversely, the microcontroller 26 can deplete charge first and then time, with a corresponding impact on the trajectory of the usage parameter. In other embodiments, the trajectory 29 can involve depleting both time and charge according to some pre-defined function.

The usage space shown in FIG. 4 is a two-dimensional usage space. In the embodiments that rely only on depleting a scalar usage parameter, the usage space is one-dimensional. However, in principle nothing prevents the use of n indicia of usage to define an n-dimensional usage space. Examples of other indicia of usage that could be used, either alone or with others, are the distance travelled, either measured mechanically by an odometer or tracked via GPS data.

Figure 5:
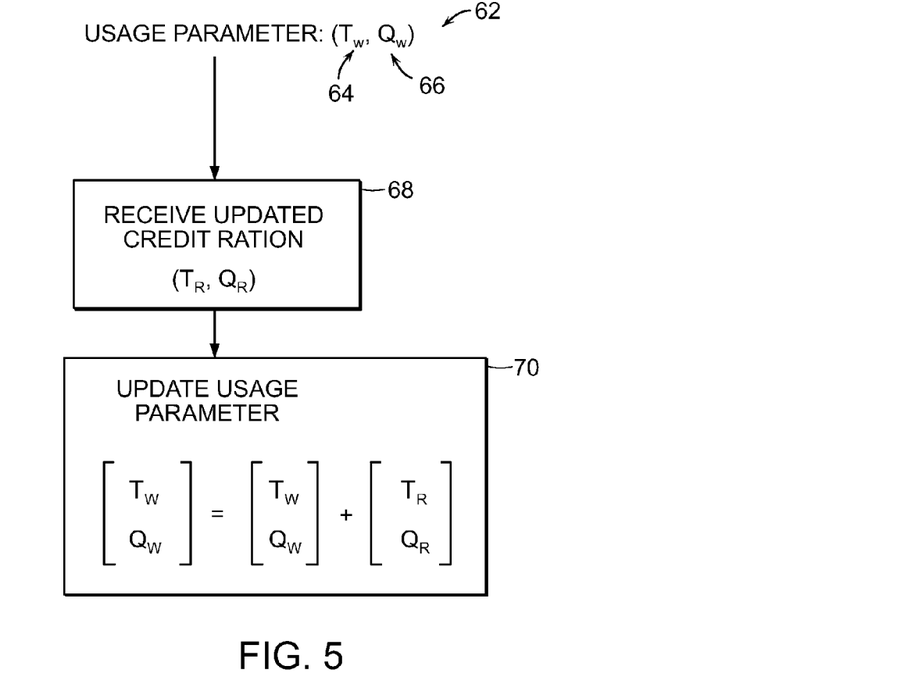
FIG. 5 shows a task carried out by a repletion site for providing additional rations for usage of the battery in FIG. 2.
Figure 6:
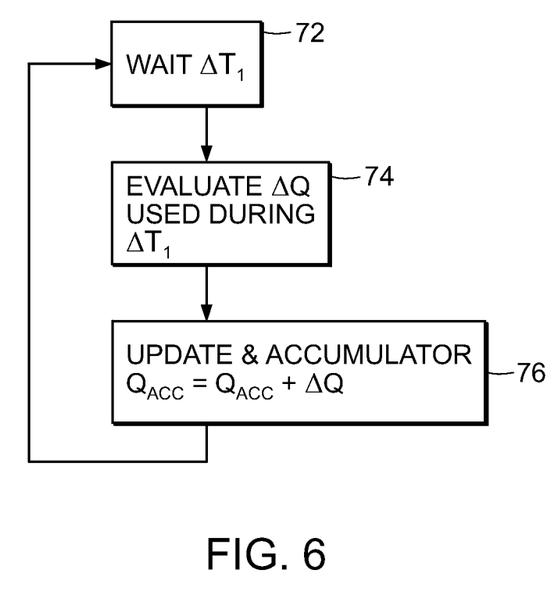
FIG. 6 shows a task carried out by the microcontroller to track usage of charge from the battery in FIG. 2.
Figure 7:
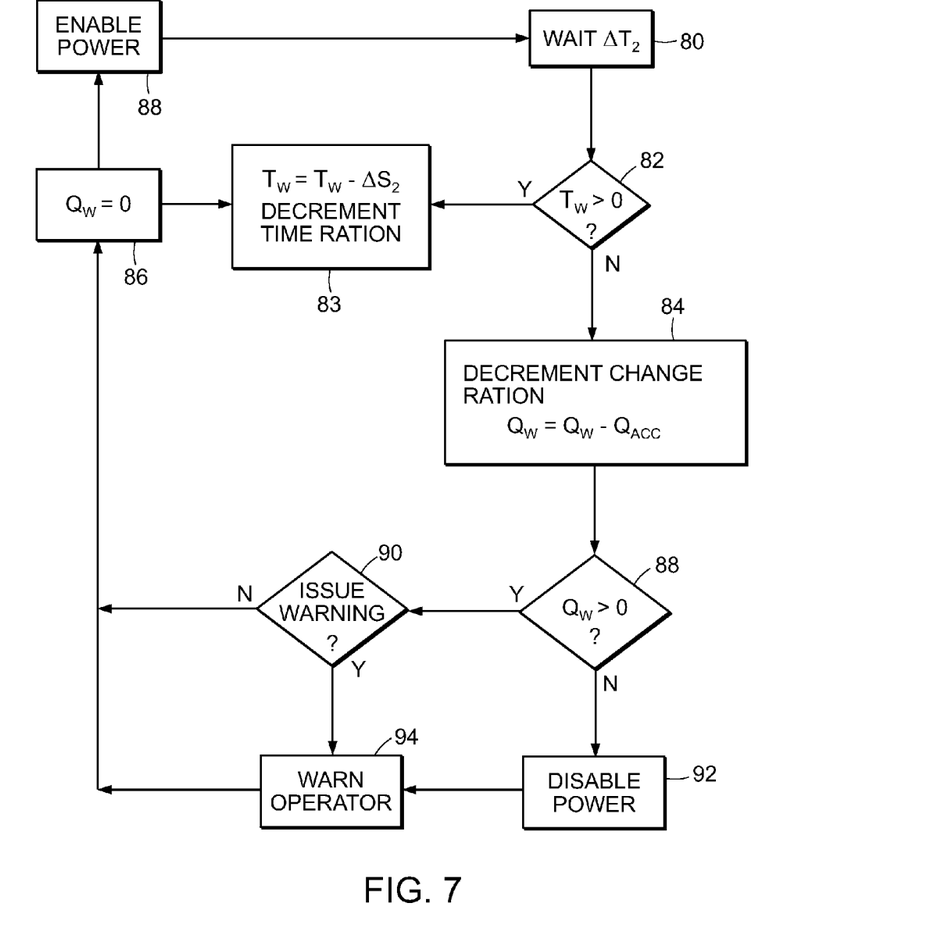
FIG. 7 shows a task carried out by the microcontroller to implement a particular trajectory in the battery usage space of FIG. 4.

FIGS. 5-7 show the operation of an embodiment in which the usage parameter is a two-dimensional vector having a time ration and an energy ration.

FIG. 5 shows a task carried out at a repletion site 14A. The usage parameter 62 in this example is a two-dimensional vector having both a time ration $T_r$ 64 and a charge ration $Q_r$ 66. The clearinghouse 12 receives, from the repletion site 14A, a ration update indicating that payment for a vector ($T_r$, $Q_r$) has been received (step 68). The clearinghouse 12 then updates the usage parameter for the user by incrementing the current value of the usage parameter ($T_w$, $Q_w$) by the additional ration ($T_r$, $Q_r$) (step 70).

FIG. 6 shows a first task carried out by the microcontroller 26 during operation of the vehicle 16A. The microcontroller 26 waits a first time interval $\Delta T_1$ (step 72) after which it evaluates an amount of charge DQ used during that interval (step 74). The microcontroller 26 then increments an accumulator $Q_{acc}$ by that amount of charge DQ (step 76). Thus, the accumulator $Q_{acc}$ maintains a running total of charge that has been used since it was last reset.

FIG. 7 shows a second task carried out by the microcontroller 26 during operation of the vehicle 16A. The task begins with enabling charge flow from the battery 18 to the motor 20 (step 78). The microcontroller 26 then waits for a second time interval $\Delta T_2$ that is longer than the first time interval $\Delta T_1$ (step 80). The microcontroller 26 then inspects the available time ration $T_w$ (step 82). If there is any remaining time ration $T_w$, the microcontroller 26 decrements it by the second time interval $\Delta T_2$ (step 83) and then resets the accumulator $Q_{acc}$ (step 86). This has the effect of ensuring that the time ration $T_w$ is used before the charge ration $Q_w$.

On the other hand, if the available time ration $T_w$ is exhausted (step 82), the microcontroller 26 begins depleting the charge ration $Q_w$ (step 84). If any charge ration $Q_w$ remains (step 88), the microcontroller 26 checks to see if the remaining charge ration $Q_w$ is low enough to warrant issuing a warning (step 90). If a warning is appropriate, the microcontroller 26 issues one (step 94). In either case, execution proceeds with resetting the accumulator $Q_w$ (step 86).

If, on the other hand, no charge ration $Q_w$ remains, the microcontroller 26 disables power flow from the battery 18 (step 92).

Viewed more broadly, the apparatus disclosed herein is a system for controlling battery operation in a remote electric vehicle 16A in response to some triggering event. In the embodiment described above, the event is the occurrence of equality between a rationed charge and an accumulated charge. However, in alternative embodiments, the distributed battery management system 10 can operate as a theft deterrent. If an electric vehicle 16A is stolen, the vehicle's owner may communicate with the clearinghouse 12 to provide information concerning the theft, at which point the clearinghouse 12 may issue a signal to cause the microcontroller 26 of the stolen electric vehicle 16A to shut down the battery 18. If an electric vehicle 16A is involved in illegal activity, for example in a car chase, police may seek a warrant to communicate with the clearinghouse 12 and cause the electric vehicle 16A to be abruptly shut down. A lessor or electric vehicles 16A-16Z may program the microcontroller 26 to shut down operation at the end of the lease period.

An optional GPS unit 27 provides a host of other triggering events related to location. For example, a dealer offering electric vehicles 16A-16Z for test drives may wish to provide a way to prevent electric vehicles 16A-16Z from being driven too far away from the dealership.

Control in response to a triggering event need not involve complete shut-down but may also involve throttling. For example, one may limit the rate of charge flow, thus controlling the power output and hence the vehicle's maximum velocity. In such cases, the presence of data from a GPS unit, together with data representative of speed limits in various locations provides a way to enforce speed limits.

A more benign use of the GPS unit is to communicate with a database of repletion stations and to identify a repletion station that is nearby. This is useful for drivers who may find that their accumulated discharge is approaching their charge ration.

A variety of electric vehicles can be used with the system described herein. However, a particularly attractive choice of electric vehicle is a motorcycle. Motorcycles are relatively light weight and tend to be used for short trips at low speed. As such, the use of a battery in a motorcycle is eminently practical. Moreover, many motorcycles are use highly polluting two-stroke engines. Replacement of such engines with an electric motor would thus offer significant environmental advantages.

Having described the invention, and a preferred embodiment thereof, what is new and claimed by Letters Patent is:

1. An apparatus for providing transportation, said apparatus comprising an electric vehicle, said electric vehicle comprising a battery, an electric motor, a transceiver, and a battery manager, said battery manager comprising a controller configured to control flow of charge between said battery and said electric motor at least in part in response to information received by said transceiver from a clearinghouse for communicating with transceivers associated with a plurality of electric vehicles, wherein said controller is configured to receive, via said transceiver, information representative of a charge ration and to control operation of said battery based on a difference between said charge ration and accumulated charge drawn since receiving said information representative of said charge ration, and wherein said electric vehicle is an all-electric vehicle.

2. The apparatus of claim 1, wherein said controller is configured to halt flow of charge between said battery and said electric motor at least in part in response to information received by said transceiver.

3. The apparatus of claim 1, wherein said controller is configured to receive, via said transceiver, information representative of a charge ration and to halt flow of charge from said battery when said charge ration and an accumulated charge drawn since receiving said information representative of said ration are equal.

4. The apparatus of claim 1, wherein said controller is configured to receive, via said transceiver, information representative of a charge ration and to provide a warning when a difference between said charge ration and an accumulated charge drawn since receiving said information representative of said charge ration reaches a pre-selected value.

5. The apparatus of claim 1, wherein said controller is configured to receive instructions, via said transceiver, to immediately exercise control over flow of charge between said battery and said motor.

6. The apparatus of claim 1, further comprising a GPS unit in communication with said controller.

7. The apparatus of claim 6, wherein said controller is configured to exercise control over flow of charge between said battery and said motor based at least in part on information provided by said GPS unit.

8. The apparatus of claim 6, wherein said GPS unit is configured to provide information representing a location of a repletion station for providing an opportunity to cause additional information to be provided to said controller via said transceiver.

9. The apparatus of claim 1, further comprising said clearinghouse for communicating with transceivers associated with a plurality of electric vehicles.

10. The apparatus of claim 9, wherein said clearinghouse is configured to receive information from a plurality of repletion stations, said information being representative of a charge ration.

11. The apparatus of claim 1, wherein said information received by said transceiver comprises information indicative of a maximum elapsed time.

12. The apparatus of claim 1, wherein said information received by said transceiver, comprises information indicative of a maximum elapsed time and information indicative of a maximum allotted charge.

13. The apparatus of claim 12, wherein said controller is configured to track time usage and charge usage and to disable charge flow from said battery in response to detecting that said charge usage has reached a first pre-defined value and that said time usage has reached a second pre-defined value.

14. The apparatus of claim 13, wherein said controller is configured to track time usage and to begin to track charge usage when said time usage has reached a first pre-defined value.

15. The apparatus of claim 14, wherein said controller is configured to disable charge flow from said battery in response to detecting that said charge usage has reached a second pre-defined value.

16. The apparatus of claim 1, wherein said electric vehicle is an electric motorcycle.

17. The apparatus of claim 1, wherein said clearinghouse the clearinghouse is configured to receive information from a plurality of repletion stations, said information being representative of a charge ration.

18. The apparatus of claim 1, wherein said clearinghouse is in communication with a plurality of repletion stations.

19. The apparatus of claim 1, wherein said controller is configured to control flow of charge between said battery and said electric motor at least in part in response to information being received by said transceiver.

20. A method for managing usage of a battery in an electric vehicle, said method comprising receiving, from a remote repletion site, information indicative of a usage ration for said battery; during operation of said electric vehicle, causing said usage ration to traverse a trajectory through a battery usage space; detecting that said usage point has reached a designated point in said usage space; and disabling charge flow from said battery to a motor of said electric vehicle.

21. The method of claim 20, wherein causing said usage ration to traverse a trajectory comprises traversing a path parallel to a time-usage axis followed by traversing a path parallel to a charge-usage axis.

22. The method of claim 20, wherein receiving information indicative of a usage ration for said battery comprises receiving, from said remote repletion site, information indicating that a user has paid for a usage ration.

* * * * *